Dec. 29, 1936.  J. L. STRATTON ET AL  2,065,833
SLIDABLE TIPPLE PLATFORM FOR VEHICLES
Filed April 5, 1935  3 Sheets-Sheet 1
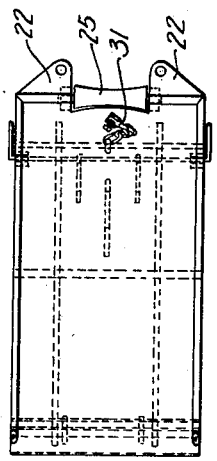
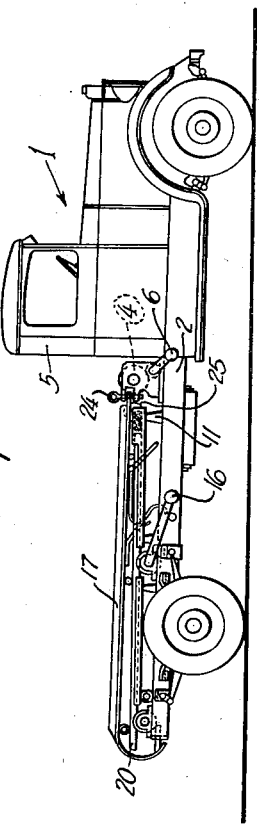
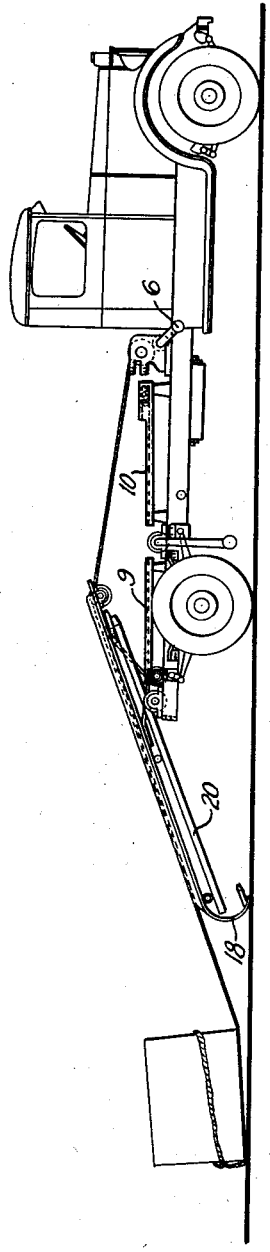

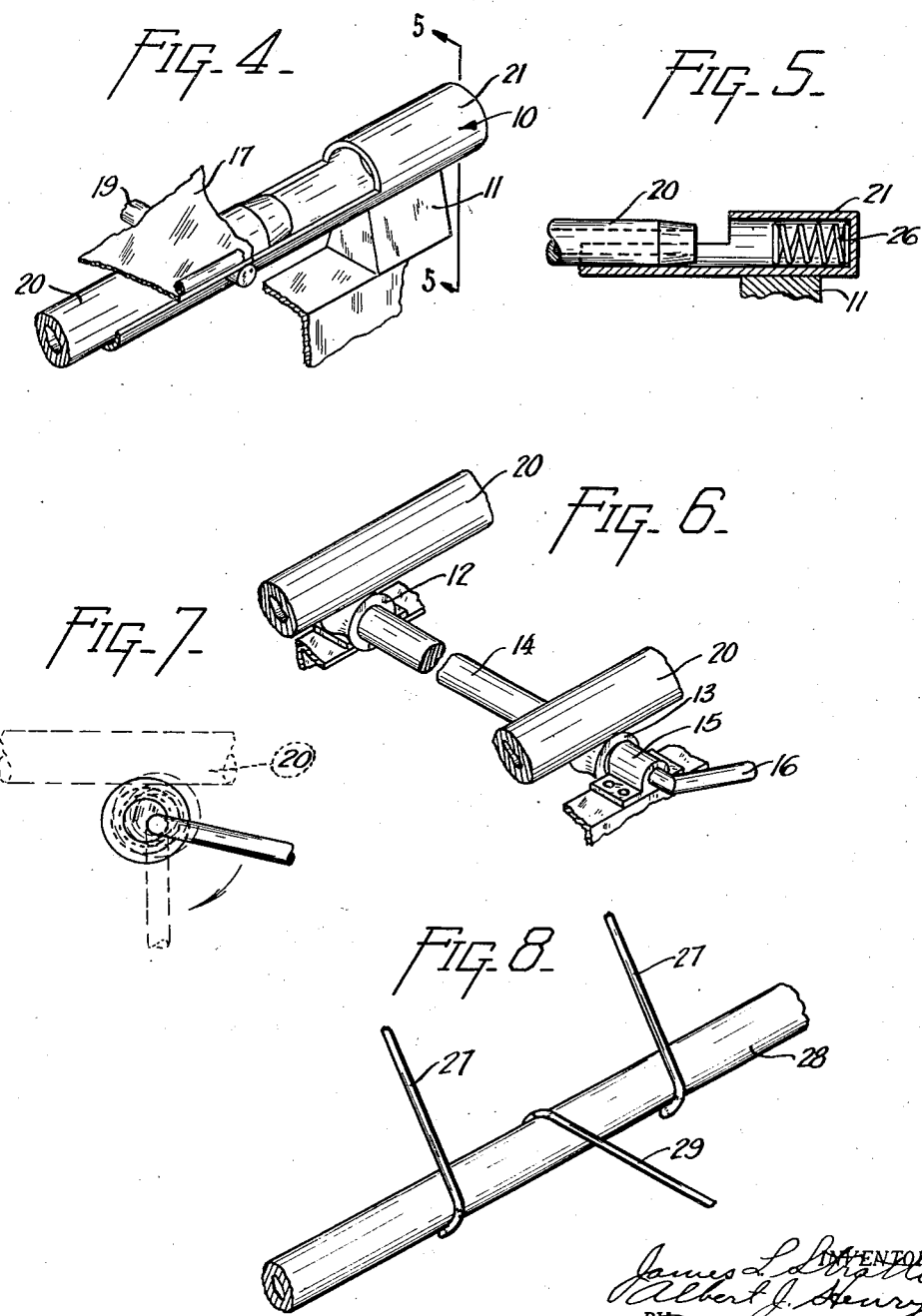

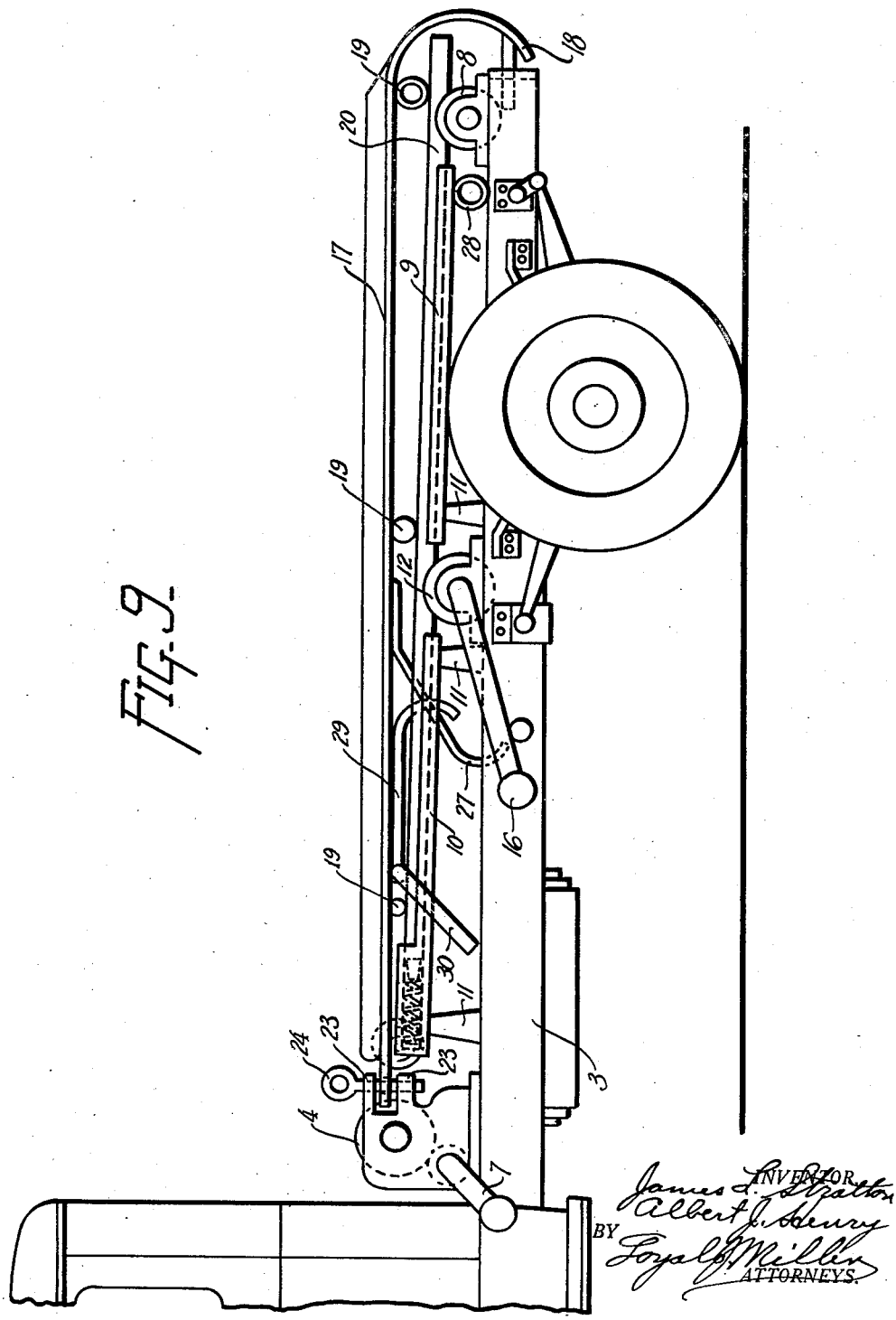

Patented Dec. 29, 1936

2,065,833

UNITED STATES PATENT OFFICE 2,065,833

SLIDABLE TIPPLE PLATFORM FOR VEHICLES

James L. Stratton and Albert J. Henry, Oklahoma City, Okla.

Application April 5, 1935, Serial No. 14,853

9 Claims. (Cl. 214—85)

This invention comprehends the provision of means whereby the platform of a truck may normally occupy a horizontal position and one parallel to the horizontal plane of beams of the truck-chassis, and be supported upon tracks and runners which are angularly related to both the chassis-beams and platform, and to so provide means for operating the runners that when they are mechanically raised, the platform is ready for initial movement automatically or by gravitation.

It is an object of the invention to provide in connection with the horizontally disposed beams of a truck-chassis, a horizontally disposable platform carried by tracks upon which it shall move and which tracks are disposed at an angle to the plane of the beams and the normal position of the platform so that when the initial movement of the platform is instituted the platform will take off gradually and rearwardly under the control of a cable from a suitable winch.

The prime object of the invention is to provide a truck platform or body capable of facilitating the loading of heavy machinery and the like.

The invention consists generally of a truck platform movable longitudinally and capable of being tipped from a horizontal position to a sloping position, and when in this position, of extending from the earth or other base to above the original level at which the platform is normally carried by the truck. The invention also includes means for moving the platform to and from its inclined position and also for drawing the object to be loaded upwardly on to the platform when in its inclined position, also to hold the platform in retained positions.

At the present time in loading heavy objects such as engine bases and the like it has been necessary with trucks of usual construction to resort to the use of a gin pole or other hoisting mechanism in order to bodily place the object on the truck. Our device is so designed that it acts in the manner of an inclined movable track upon which the object is drawn by a cable and as the object passes up the track and reaches the point at which the track engages its supporting structure the platform acts as a tipple and pivots to a substantially horizontal position, after which, the object and the platform move longitudinally in a forward direction until the object is in the desired position upon the truck. In unloading the object the operation is practically reversed.

Other objects of the invention are to provide a device of this class which is new, novel, practical and of utility; which is simple in construction, positive in action, and economical and proficient in operation; which is strong and durable; and, which will be efficient in accomplishing all the purposes for which it is intended.

With these and other objects in view as will more fully appear hereinbelow, our invention consists in the construction, novel features, and combination of parts hereinafter more fully described, pointed out in the claims hereto appended, and illustrated in the accompanying three-sheet drawings, of which,

Figure 1 is an elevational side view of a truck upon which the invention has been installed;

Figure 2 is a plan view of the platform removed from the truck;

Figure 3 is a side elevation showing the platform in position to receive an object;

Figures 4, 5, 6, 7 and 8 are fragmentary details of various portions of the device; and, Figure 9 is an enlarged fragmentary view similar to Fig. 1 but showing the opposite side of the truck.

Like characters of reference designate like parts in all the figures.

It is understood that various changes in the form, proportion, size, shape, weight and other details of construction, within the scope of our invention may be resorted to without departing from the spirit or broad principle of our invention and without sacrificing any of the advantages thereof; and it is also understood that the drawings are to be intepreted as being illustrative and not restrictive.

The inventive idea involved is capable of receiving a variety of mechanical expressions one of which, for the purpose of illustrating the invention, is shown in the accompanying drawings wherein:—

The reference numeral 1 indicates a suitable truck having side beams 2 and 3 which support a suitable winch 4 which is preferably located adjacent and at the rear of the cab 5. The winch 4 is depicted in the drawings as being manually operated from either side by crank arms 6 and 7, but may be powered by the vehicle's motor if desired. Pivotally supported in bearings upon and above and extending between the rear ends of the side beams 2 and 3 is a roller 8. A pair of rear track members 9 and like front track members 10 are rigidly supported angularly to the beams 2 and 3 by suitable means 11 and are formed preferably of half-sections of pipe, thus providing arcutely concave tracks. Mounted between the side beams 2 and 3 and located longitudinally thereof at a point between the adjacent ends of the front and rear track members are a pair of spaced rollers 12 and 13, the shaft 14 of which is journaled in bearings 15. Connected to the shaft 14 are crank arms 16 which are eccentric with the axis of the shaft 14 and are adapted to therefore raise the rollers 12 and 13 to a height above the lowermost upper surface of the track members 9 and 10. When in a raised position the upper surfaces of the rollers 12 and 13 are at all times above the upper surface of the roller 8 at the rear end of the beams.

A platform 17 preferably formed of a single sheet of steel and having a rear arcuate end 18 is connected by a plurality of transverse cross-beams 19 to spaced tubular runners 20 which are adapted to lie within the upper arcuate surfaces of the track members 9 and 10 when the rollers 12 are at the lowermost position of their throw. This rear arcuate end 18 not only has the function of a platform position retainer, but also provides for a resilient support when the platform is tilted forward toward the ground.

As may best be seen in Figs. 4 and 5 the forward ends of each of the track members 10 are provided with a closed ended cylindrical portion 21 into which the forward ends of the runners 20 seat when the platform 17 is at the forward end of its throw. The portions 21 are preferably provided with shock absorbing springs 26. The forward end of the platform is provided with a pair of projecting ears 22 which are adapted to engage within spaced projections 23 carried by the frame of the winch 4 and the platform is held against inadvertent rearward movement by pins 24. A winch-cable-guiding roller 25 is pivotally mounted at the front end of the platform between the projecting ears 22.

The nether surface of the platform 17 at a point adjacent its longitudinal center is equipped with two depending hooks 27 which are adapted to engage a cross-member 28 located adjacent to and forward of the roller 8 when the platform is at the rearmost end of its throw and is located in an inclined position as illustrated in Fig. 3. A second hook 29 is pivotally connected to the bottom surface of the platform 17 and points in a direction opposite to the hooks 27 and is adapted to be hooked around the cross-member 28 to co-act with the hooks 27 in preventing any longitudinal movement in either direction. A crank 30 acts to operate the hook 29.

Operation

In operation the eccentrically mounted shaft 14 is rotated by the crank 16 to raise the rollers 12 and 13 and, after the pins 24 have been removed the platform gravitates to a longitudinal position in which the hooks 27 engage the cross-member 28. At this time the curved portion 18 of the platform has tipped and is then resting upon the ground. A cable from the winch 4 is extended over the roller 25 and past the lower or rear end of the platform where it is attached in any desired manner to the object to be loaded. The crank 30 is moved to engage the hook 29 with the cross-member 28 and the winch 4 is placed in operation to wind the cable thereon. The forward end of the object being loaded is preferably passed over the cable at the time of its attachment and therefore the cable acts as a means to raise the front end of the object sufficiently to clear the curved portion 18 of the platform. As the object is drawn upwardly on the platform, and when its weight reaches a point forward of the roller 8 the platform assumes a horizontal position. At this time the hook 29 is disengaged from the member 28 and the platform together with its member is drawn forward until the front ends of the runners 20 enter their seated position within the cylindrical portion 21 of the tracks 10. The pins 25 may then be installed and the rollers 12 lowered until the runners 20 are seated within the arcuate tracks 9 and 10. If it is desired to draw the object to the front end of the platform this, of course, is possible by use of the winch. If the object being loaded does not have sufficient frictional engagement with the upper surface of the platform 17 a chain and cable clamp 31 (Fig. 2) may be attached to the cable in order to insure forward movement of the platform.

Obviously, the invention is susceptible of embodiment in forms other than that which is illustrated in the accompanying drawings and described herein, and applicable for uses and purposes other than as detailed, and we therefore consider as our own all such modifications and adaptations and other uses of the form of the device herein described as fairly fall within the scope of our invention.

Having thus described our invention, what is claimed and desired to be secured by Letters Patent, is:

1. In a device of the kind set forth, the combination with a chassis having a frame including two horizontally disposed beams, of a horizontally disposable tipple platform associated therewith, means intermediate the beams and the platform and angularly disposed with relation to both the beams and the platform for allowing the platform to move rearward away from the beams, means to mechanically control said means to initiate the platform movement and means to retain the platform in moved position.

2. In a device of the kind set forth, the combination with a chassis having a frame including two horizontal and parallel beams, of a horizontally disposable tipple platform associated therewith, means intermediate the beams and the platform for moving the platform initially gradually, and associated angularly with relation to said beams and said platform, means to mechanically control the intermediate means to allow the gradual take off of the platform through a skidding movement from the beams, a cushioned element associated with the platform, means to shock-absorb the platform and its runners while approaching its normal position upon the chassis, means to hold the platform against movement, and means to hold the platform while in an angular position relative to the chassis.

3. In a device as set forth, a chassis having elongated parallel and horizontally disposed beams, a tipple platform mounted above the same and in association therewith, and also normally horizontally disposed in parallelism with said beams, means to retain said platform in said position, an intermediate trackage angularly disposed with relation to said horizontal disposition of the beams and the platform, runners on the nether side of the platform, and at an angle to the plane thereof, tracks at an angle to the beams and in connection with which the runners are associated, means for raising and lowering the runners with relation to the tracks, to give initial impetus from an inclined plane to the platform, means carried by the platform for holding the same in tilted position, and means upon tilting of the platform to cushion its free end in tilted position.

4. Organization set forth in claim 3 and means for holding the platform fixed at each end of its permitted travel.

5. Organization set forth in claim 3 and in which the degree of permitted incline is sufficient to permit the body to shock-absorbingly contact the surface to which it is sent.

6. Organization set forth in claim 3 in which the platform when released in its forward position may be mechanically moved to gravitate to its full rearward position.

7. In a structure as set forth, the combination with a chassis having a pair of horizontal beams, of pairs of inclined tracks supported thereupon, a pair of runners adapted to rest upon and be elevated from said tracks, means co-operating with the runners to change the plane thereof, irrelatively sized cross-beams carried by said runners, a normally horizontal platform mounted on said cross beams, means to raise the runners from the tracks to permit them to move relatively thereto, and means to shock-absorb the runners as they approach normal position.

8. In a structure as set forth, the combination with a chassis and its appurtenances, and having a pair of horizontal beams, a pair of bearings mounted thereon, rollers carried thereby, means to change the position of one set of rollers, tracks in pairs and inclined with relation to the chassis beams, means to support the tracks, runners adapted to rest upon and be moved from said tracks, irrelatively sized cross beams connecting said runners and having their upper sides in a common horizontal plane, a platform resting on said cross beams, means to retain this platform in normal horizontal position, means to cushion the outer free end of the platform when tilted upon the beams, and means to pull both the platform and the lading from a tilted to a horizontal position.

9. In a device of the kind set forth, the combination with a chassis having a frame consisting of parallel and horizontal side beams, of a system of trackage thereupon and inclined relatively thereto, a winch mounted on the beams, bearings on said beams, rollers carried thereby, upright standards of unequal length rising from the beams to support the trackage, runners located with relation to and removable from said tracks, irrelatively sized cross-beams carried by the runners, a platform mounted on the cross-beams and normally disposed at an angle to the track and parallel to said beams, means on the nether side of the platform for engaging said rollers, means to retain the platform in normal position, means for converting one set of rollers into lifts for said runners, and means to shock-absorb the runners during their approach to normal position.

JAMES L. STRATTON.
ALBERT J. HENRY.